United States Patent
Kaltenbach

(10) Patent No.: US 9,650,159 B2
(45) Date of Patent: May 16, 2017

(54) METHOD AND DEVICE FOR ELECTRIC SATELLITE PROPULSION

(71) Applicant: THALES, Courbevoie (FR)

(72) Inventor: Alexandre Kaltenbach, Cannes (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/913,975

(22) PCT Filed: Aug. 29, 2014

(86) PCT No.: PCT/EP2014/068343
§ 371 (c)(1),
(2) Date: Feb. 23, 2016

(87) PCT Pub. No.: WO2015/028588
PCT Pub. Date: Mar. 5, 2015

(65) Prior Publication Data
US 2016/0207640 A1      Jul. 21, 2016

(30) Foreign Application Priority Data

Aug. 30, 2013  (FR) .................................... 13 02017

(51) Int. Cl.
*B64G 1/00*       (2006.01)
*B64G 1/24*       (2006.01)
*B64G 1/40*       (2006.01)
*F03H 1/00*       (2006.01)

(52) U.S. Cl.
CPC ............ *B64G 1/007* (2013.01); *B64G 1/405* (2013.01); *B64G 1/242* (2013.01); *B64G 1/40* (2013.01); *B64G 2001/245* (2013.01); *F03H 1/0037* (2013.01)

(58) Field of Classification Search
CPC .................................. B64G 1/26; F02K 1/00
See application file for complete search history.

(56) References Cited

U.S. PATENT DOCUMENTS

| | | | | |
|---|---|---|---|---|
| 5,618,012 A | * | 4/1997 | Lehner .................... | B64G 1/24 244/168 |
| 6,032,904 A | * | 3/2000 | Hosick .................... | B64G 1/26 244/169 |
| 6,053,455 A | * | 4/2000 | Price ....................... | B64G 1/26 244/169 |
| 6,068,217 A | * | 5/2000 | Stoen ...................... | B64G 1/24 244/164 |

(Continued)

FOREIGN PATENT DOCUMENTS

| | | |
|---|---|---|
| EP | 0 780 300 A1 | 6/1997 |
| EP | 0 922 635 A1 | 6/1999 |
| EP | 1 227 037 A2 | 7/2002 |

*Primary Examiner* — Angela Ortiz
*Assistant Examiner* — Alex C Dunn
(74) *Attorney, Agent, or Firm* — Baker & Hostetler LLP

(57) ABSTRACT

An electric propulsion device for a satellite equipped with at least four active thrusters exerting a parallel thrust upon a transfer, the device comprises means for detecting a thruster failure and means for reorienting the thrusters, and comprises means for computing a reorientation angle of the thrusters remaining active upon a failure of a thruster, the value of the angle being computed to reorient at least two of the remaining thrusters in order to cancel the total torque about the center of mass of the satellite.

8 Claims, 6 Drawing Sheets

(56) References Cited

U.S. PATENT DOCUMENTS

| | | | | |
|---|---|---|---|---|
| 6,135,393 A | * | 10/2000 | Sackheim | B64G 1/26 244/169 |
| 6,260,805 B1 | | 7/2001 | Yocum et al. | |
| 6,441,776 B1 | * | 8/2002 | Hein | B64G 1/24 244/164 |
| 6,508,438 B2 | * | 1/2003 | Eyerly | B64G 1/26 244/164 |
| 6,581,880 B2 | * | 6/2003 | Randolph | B64G 1/242 244/169 |
| 6,990,396 B2 | * | 1/2006 | Wang | B64G 1/24 244/164 |
| 7,093,800 B2 | * | 8/2006 | Salvatore | B64G 1/402 244/135 C |
| 7,185,856 B2 | * | 3/2007 | Bang | B64G 1/24 244/164 |
| 8,457,810 B1 | * | 6/2013 | Batla | B64G 1/007 244/158.4 |
| 8,666,694 B2 | * | 3/2014 | Kraetz | G01C 25/005 701/4 |
| 8,735,788 B2 | * | 5/2014 | Preston | F42B 10/661 244/3.1 |
| 8,798,816 B1 | * | 8/2014 | Guyot | B64G 1/28 244/164 |
| 8,930,048 B1 | * | 1/2015 | Batla | B64G 1/007 244/158.4 |
| 2005/0040282 A1 | | 2/2005 | Wingo | |

* cited by examiner

METHOD AND DEVICE FOR ELECTRIC SATELLITE PROPULSION

CROSS-REFERENCE TO RELATED APPLICATIONS

This application is a National Stage of International patent application PCT/EP2014/068343, filed on Aug. 29, 2014, which claims priority to foreign French patent application No. FR 1302017, filed on Aug. 30, 2013, the disclosures of which are incorporated by reference in their entirety.

FIELD OF THE INVENTION

The invention relates to the field of satellites and in particular that of the transfer of a satellite from the injection orbit by the launch vehicle to its final orbit.

BACKGROUND

Recent developments in electric satellite propulsion make it possible to envisage performing a large part of the transfer by using this electric propulsion. Since this propulsion has a much better efficiency, it is then possible to lower the mass upon the launching of the satellites for equal missions.

The main drawback with electric propulsion is its weak thrust, which substantially increases the time needed for the transfer. In order to control this time, it is then necessary to increase the thrust to the maximum of the capabilities of the satellite.

Another feature of electric thrusters is the fact that the thruster is optimized for its maximum operating point. When the thruster is used with a lesser power, its efficiency (mN/W) and its specific impulse decrease.

Since the cost of the electric propulsion systems is high, the most common configuration is to have four thrusters mounted on pointing mechanisms. These thruster/mechanism assemblies are formed preferably toward the anti-earth face of the satellite.

To perform an electric transfer maneuver with maximum thrust, all four thrusters are used in parallel.

In the event of failure of one of the four active thrusters, the known solutions for mitigating the lack of a thruster are:

either to use two thrusters. Now, the drawback is that, in this case, the transfer time increases. In the worst case in which the failure occurs at the beginning of the LEOP (Launch an Early Orbit Phase—phase beginning upon the separation from the launch vehicle and ending when the satellite is operational in its final orbit) with a power dimensioning in which the four thrusters are used at 100%, the transfer time can be doubled;

or to use the mechanisms on which thrusters are mounted in order to repoint the three remaining thrusters toward the center of gravity. Now, the drawback is that the xenon consumption increases and the transfer time is not optimized.

Thus, there is a need for a solution which mitigates the various drawbacks in the prior art solutions to perform an electric transfer with a maximum thrust in the event of failure of one thruster out of the active thrusters of a satellite. The present invention meets this need.

SUMMARY OF THE INVENTION

One object of the present invention is to propose a device to make it possible to mitigate the deficit of a satellite thruster upon a transfer to its orbit by retaining a maximum thrust.

The principle of the invention consists in balancing the torques induced by the thrust of the active thrusters so as to keep the directions of thrust of the thrusters parallel to one another.

Advantageously, the device of the invention makes it possible to maximize the effective thrust and optimize the transfer time, while reducing the xenon consumption.

Still advantageously, in nominal configuration, in the case where the power onboard a satellite does not make it possible to use the thrusters at 100% of their thrust, the device makes it possible to optimize the nominal transfer time and the xenon consumption by having the satellite operate on three thrusters.

To this end, the subject of the invention is an electric propulsion device for a satellite equipped with at least four active thrusters exerting a parallel thrust upon a transfer, the device comprising means for detecting a thruster failure and means for reorienting the thrusters, the device being characterized in that it comprises means for computing a reorientation angle of the thrusters remaining active upon a failure of a thruster, said angle being computed to reorient at least two of the thrusters remaining active in order to cancel the total torque about the center of mass of the satellite.

Preferentially, the thrusters are associated with mechanisms formed toward the anti-earth face of the satellite. The thrusters are preferably electric thrusters, either Hall effect thrusters or gated ion motors.

In one embodiment, all the active thrusters are reoriented according to the computed angle value.

In another embodiment, two active thrusters are reoriented according to the computed angle value and the third remains pointed along the axis −Z.

The invention also covers a satellite which comprises an electric propulsion device as described, and in particular a satellite equipped with four thrusters.

DESCRIPTION OF THE FIGURES

Different aspects and advantages of the invention will emerge with the support of the description of a preferred mode of implementation of the invention, but nonlimiting, with reference to the figures below.

DETAILED DESCRIPTION OF THE INVENTION

Figure 1:
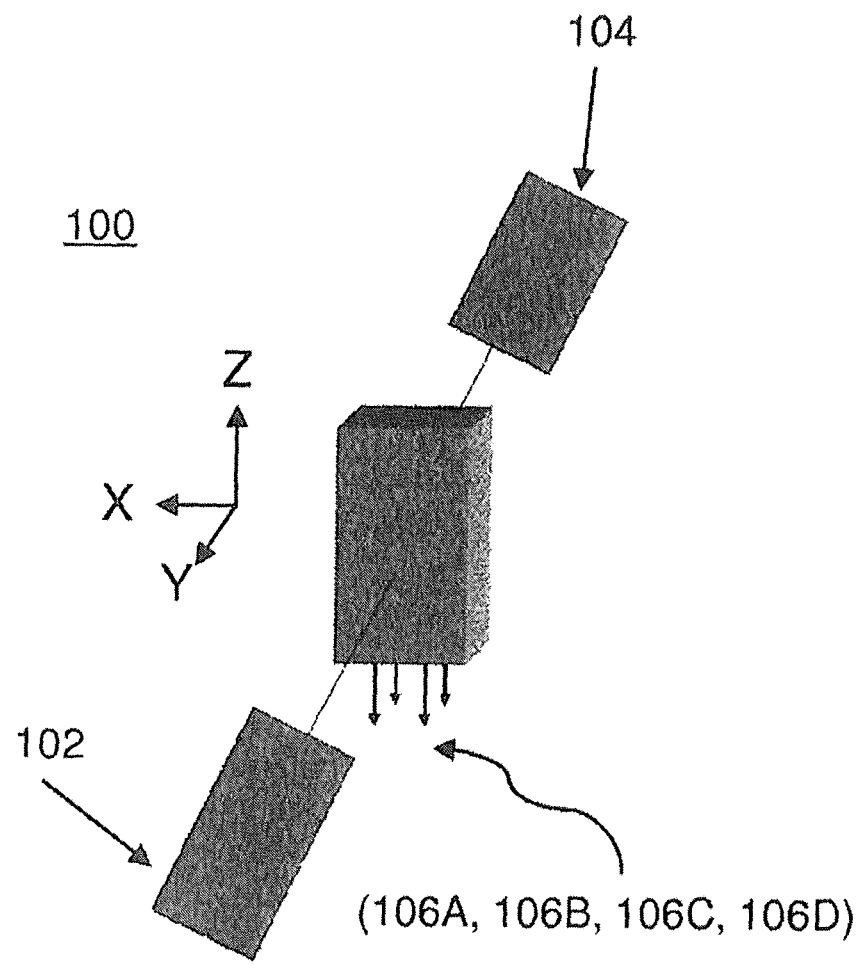
FIG. 1 illustrates a nominal transfer configuration using four thrusters.

FIG. 1 schematically illustrates a satellite 100 on which the device of the invention is advantageously implemented. The satellite is generally equipped with solar panels (102, 104) which are fixed to the north and south walls of the satellite. In the example chosen, the satellite is equipped with four thrusters (106A, 1066, 106C, 106D) mounted on pointing mechanisms that are not represented but consisting of articulated elements allowing for thruster orientation movements. The U.S. Pat. No. 6,032,904 from D. Hosick describes such satellite thruster attachment devices.

The thrusters are preferentially electric thrusters, typically Hall-effect thrusters or gated ion motors.

These thrusters are mounted on one or more pointing mechanisms allowing them to have an equal or similar direction of thrust.

Figure 2:
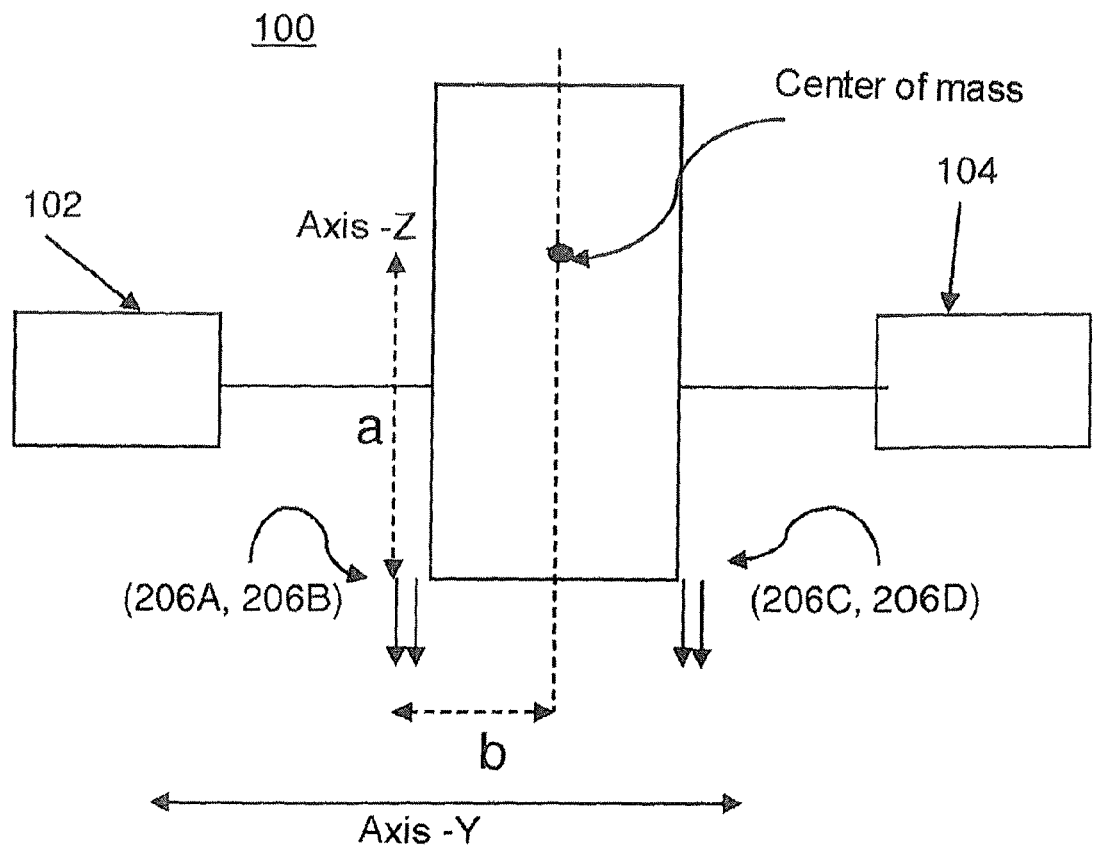
FIG. 2 is a projection on an axis of the configuration of FIG. 1.

FIG. 2 is a simplified representation in a plane YZ of the general four-thruster configuration of FIG. 1. The elements that are identical from one figure to another are indicated by the same references. In the interests of clarity of the description and for simplicity, the thrusters are assumed to all be in the plane YZ of the center of mass. However, a person skilled in the art will understand that the principles of the present invention can be applied to the more general case in which the thrusters are not all in the same plane. The relative position of the center of thrust of the thrusters relative to the center of mass is located at a distance denoted 'a' on the axis −Z and a distance denoted 'b' on the axis −Y. The figure illustrates an optimal electric transfer case using four thrusters. As shown by the arrows (206A, 206B, 206C, 206D), the four thrusters thrust in the same direction. The total thrust is therefore four times the individual thrust of each thruster. The control of the trajectory (piloting) can be done in two ways:

either the thrust of each thruster is modulated so as to adjust the position of the overall thrust vector relative to the center of mass;

or the direction of thrust of each thruster is adjusted by virtue of a pointing mechanism again so as to adjust the position of the overall thrust vector relative to the center of mass.

Figure 3:
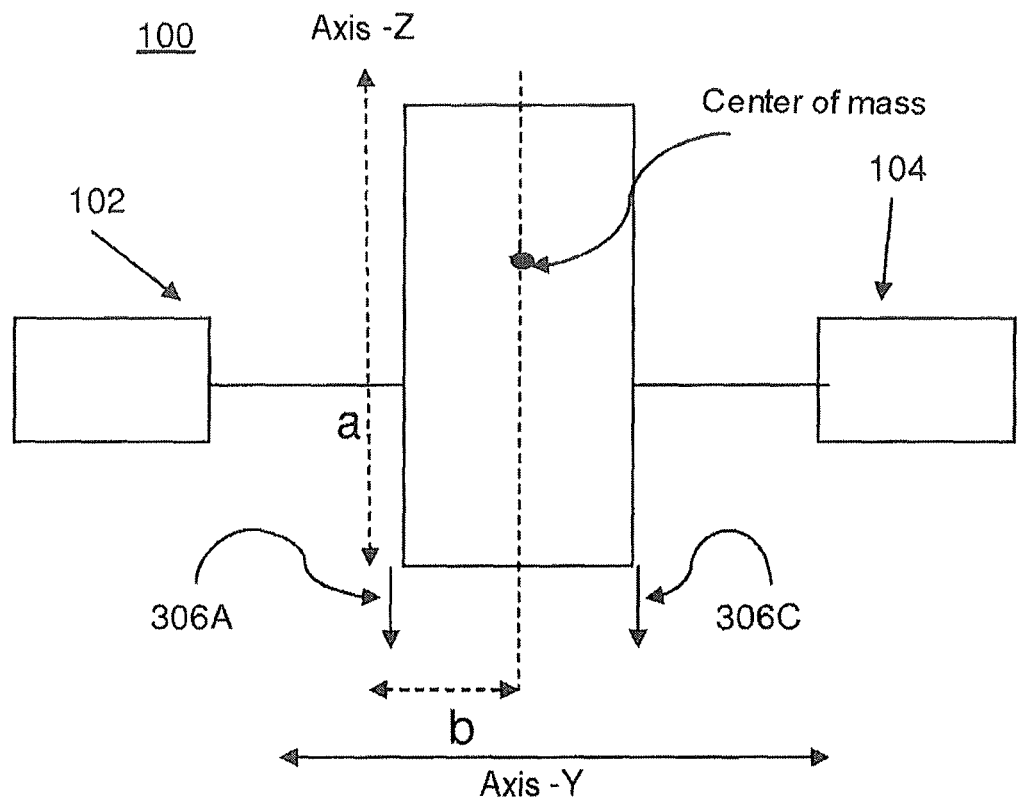
FIG. 3 illustrates a transfer configuration using two thrusters in the event of failure.

FIG. 3 is a simplified view on an axis YZ in the case of failure of one of the four thrusters of a satellite such as that of FIG. 1. In the case illustrated, only two thrusters remaining active are used according to their initial thrust axis represented by the arrows (306A, 306c). The resultant thrust is then equal to only two times the thrust of one thruster, which significantly lengthens the transfer time.

Figure 4:
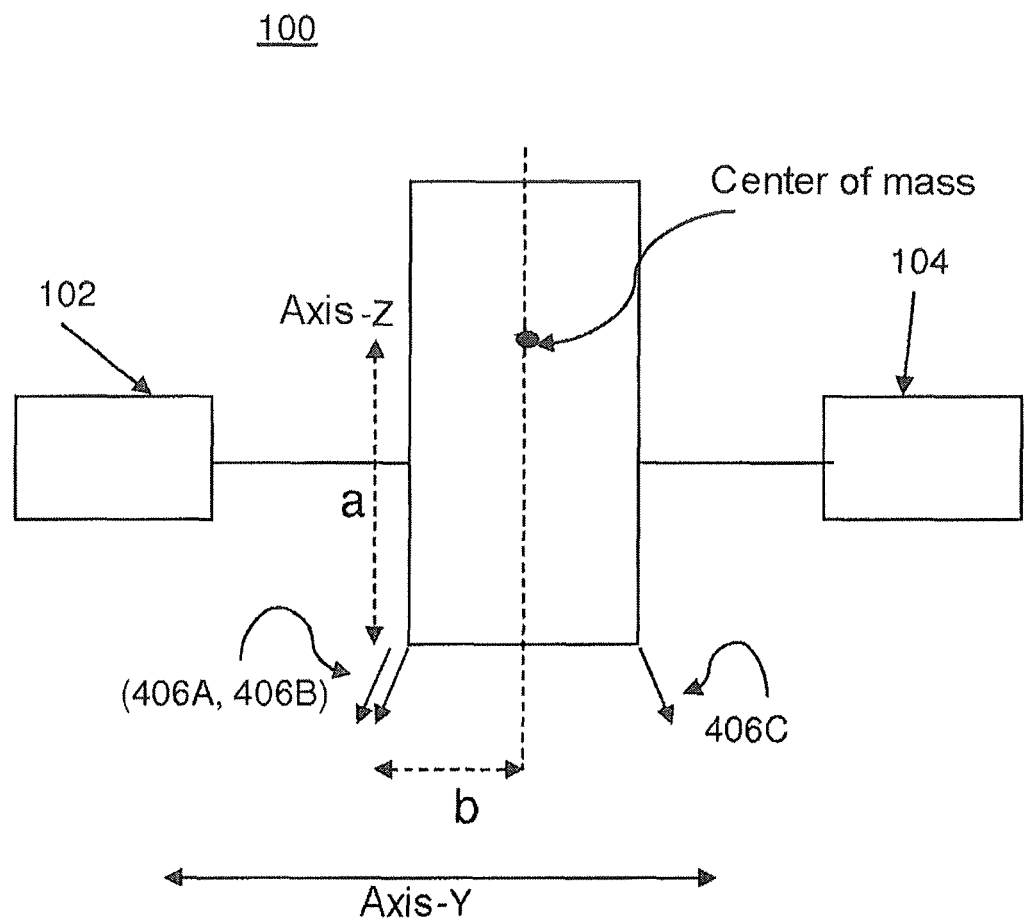
FIG. 4 illustrates a transfer configuration using three thrusters in the event of failure.

FIG. 4 illustrates, in a simplified view on an axis YZ, the case of failure of one of the four thrusters of a satellite such as that of FIG. 1 in which the three remaining thrusters are used by being reoriented. The reorientation is done in such a way that the direction of thrust passes through the center of mass, as indicated by the arrows (406A, 406B, 406C). The overall thrust is not the sum of the thrusts of the three thrusters, and the transfer is not optimized.

Figure 5:
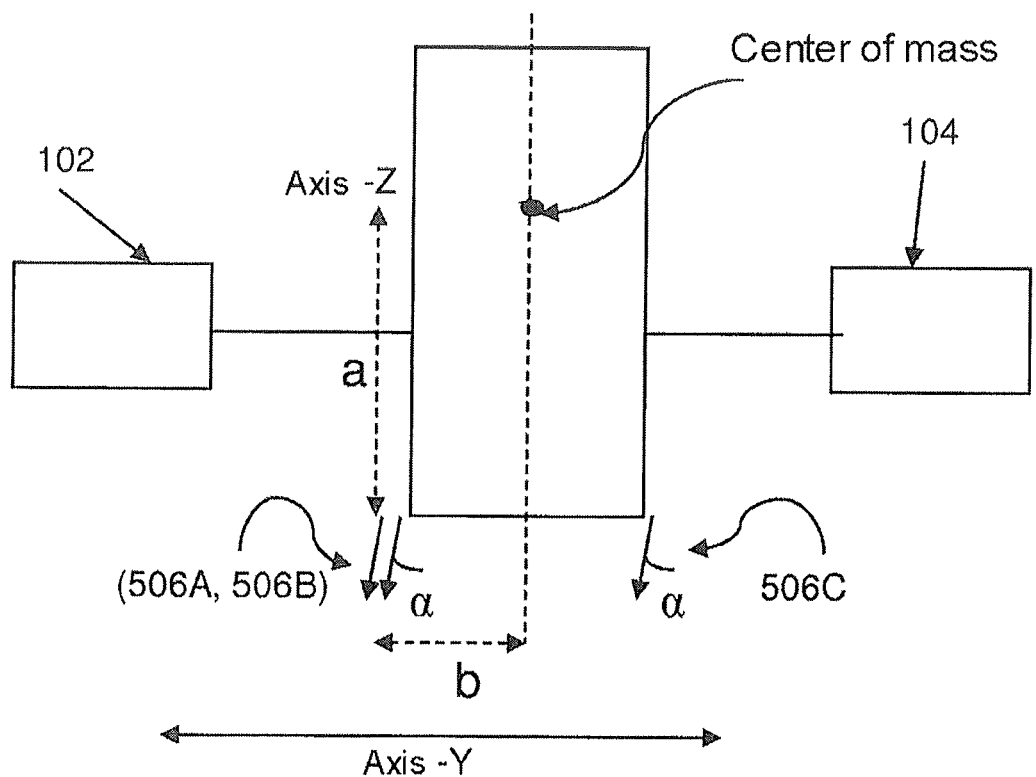
FIG. 5 is an illustration of a transfer using three thrusters according to a first mode of the invention.

FIG. 5 illustrates, in a simplified view on an axis YZ, the case of failure of one of the four thrusters of a satellite such as that of FIG. 1 with a reorientation of the three thrusters remaining active according to the principle of the invention. When a thruster failure is detected, the thrusters remaining active are reoriented to allow an optimal transfer using all the active thrusters. The reorientation is computed in such a way that an angle denoted 'α' between the direction of thrust of a thruster and the axis −Z of the satellite is identical for all three thrusters, the angle being computed in order to cancel the total torque about the center of mass of the satellite. As is well known to those skilled in the art, in mechanics, a null torque means that the resultant of the forces passes through the center of mass.

In a simplified manner, the angle 'α' is computed according to the following equation:

$$\tan(\alpha) = b/(3a), \quad (1)$$

in which

'a' is the distance on the axis 'Z' of the relative position of the center of thrust of the thrusters relative to the center of mass, and in which 'b' is the distance on the axis 'Y' of the relative position of the center of thrust of the thrusters relative to the center of mass.

No particular description is given concerning the pointing mechanisms which make it possible to reorient the thrusters when the reorientation angle has been computed, but a person skilled in the art will appreciate that current mechanisms can be used.

Figure 6:
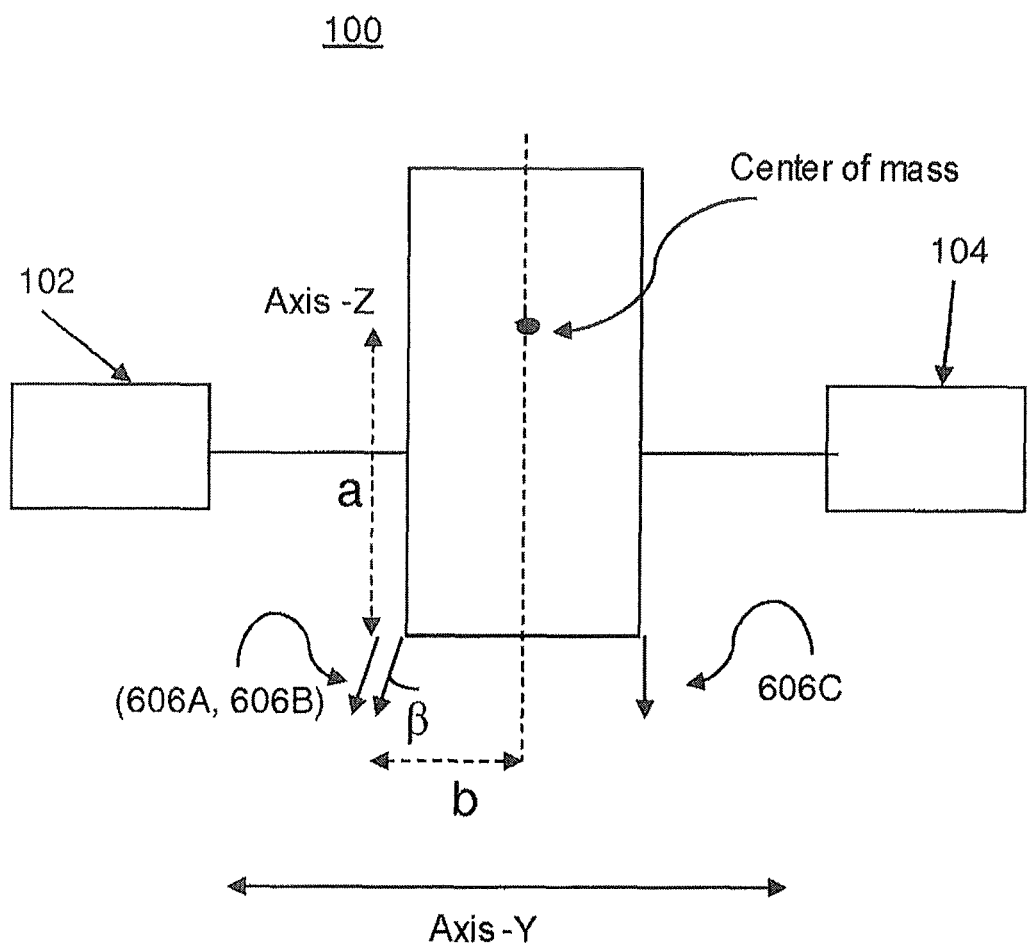
FIG. 6 is an illustration of a transfer using three thrusters in another configuration of the invention.

FIG. 6 represents a variant application of the principle of the invention in which a constraint on the pointing mechanisms is applied in order to avoid orienting the thrust of the thrusters "under" the satellite. This constraint can originate either from a technological limitation for the mechanisms, or from the provision of other equipment items on the satellite which would not tolerate interference with the plasma jet from the thrusters.

In the variant of FIG. 6, the reorientation angle of the active thrusters is applied to only two thrusters, the third not being reoriented and remaining pointed in axis −Z in the example of FIG. 6.

The reorientation angle denoted 'β' to be applied between the direction of thrust of two thrusters and the axis −Z of the satellite is computed according to the following simplified formula:

$$b = 2\cos(\beta)^*(b - a^*\tan(\beta)),$$

in which

'a' is the distance on the axis 'Z' of the relative position of the center of thrust of the thrusters relative to the center of mass, and in which 'b' is the distance on the axis 'Y' of the relative position of the center of thrust of the thrusters relative to the center of mass.

In a variant implementation, it is possible to provide additional thrusters, which are either fixed and directed toward the center of mass, or mounted on orientation mechanisms. These additional thrusters make it possible to have a redundant thruster for cases in which the satellite is powerful enough to use four thrusters or more in transfer. More generally, the device makes it possible to have an n+1 redundancy for n thrusters.

The present description illustrates a preferential implementation of the invention, but is nonlimiting. An example has been chosen to allow a good understanding of the principles of the invention, and a concrete application, but it is in no way exhaustive and should allow a person skilled in the art to add modifications and variants of implementation while keeping the same principles.

The invention claimed is:

1. A propulsion device for a satellite equipped with at least four active thrusters used in parallel, exerting a parallel thrust upon a transfer, the device comprising means for detecting a thruster failure and means for reorienting the thrusters, the device further comprising means for computing a reorientation angle of the thrusters remaining active upon a failure of a thruster, said reorientation angle being computed to reorient at least two of the remaining active thrusters according to a same computed reorientation angle in order to cancel the total torque about the center of mass of the satellite, wherein two active thrusters are reoriented according to the computed reorientation angle.

2. The device as claimed in claim 1, wherein the thrusters are associated with mechanisms formed toward an anti-earth face of the satellite.

3. The device as claimed in claim 1, wherein all the active thrusters are reoriented according to the same computed reorientation angle.

4. The device as claimed in claim 1, wherein the thrusters are electric thrusters.

5. The device as claimed in claim 4, wherein the thrusters are Hall-effect thrusters.

6. The device as claimed in claim 4, wherein the thrusters are gated ion motors.

7. A satellite comprising a propulsion device for said satellite equipped with at least four active thrusters used in parallel, exerting a parallel thrust upon a transfer, the device comprising means for detecting a thruster failure and means for reorienting the thrusters, the device further comprising means for computing a reorientation angle of the thrusters remaining active upon a failure of a thruster, said reorientation angle being computed to reorient at least two of the remaining active thrusters according to a same computed reorientation angle in order to cancel the total torque about the center of mass of the satellite, wherein two active thrusters are reoriented according to the computed reorientation angle.

8. A method for reorienting the thrusters of an electric propulsion device for a satellite equipped with at least four active thrusters exerting a parallel thrust upon a transfer, the method comprising the steps of:

detecting a failure of one of the thrusters, computing a reorientation angle of the thrusters remaining active, a value of said reorientation angle being computed in order to cancel the total torque about the center of mass of the satellite; and reorienting, by the value of said reorientation angle, at least two of the thrusters remaining active, wherein two active thrusters are reoriented according to the computed reorientation angle.

* * * * *